United States Patent
Stefanescu

(10) Patent No.: US 10,431,364 B2
(45) Date of Patent: Oct. 1, 2019

(54) ELECTRO-MECHANICAL DEVICE AND MANUFACTURING METHODS FOR VARIOUS APPLICATIONS

(71) Applicant: Petre Serban Stefanescu, Saint-Maur des Fosses (FR)

(72) Inventor: Petre Serban Stefanescu, Saint-Maur des Fosses (FR)

(73) Assignee: C&C TECHNOLOGIES, LLC, Newark, DE (US)

( * ) Notice: Subject to any disclaimer, the term of this patent is extended or adjusted under 35 U.S.C. 154(b) by 21 days.

(21) Appl. No.: 14/778,086

(22) PCT Filed: May 13, 2014

(86) PCT No.: PCT/US2014/037769
§ 371 (c)(1),
(2) Date: Sep. 18, 2015

(87) PCT Pub. No.: WO2015/130331
PCT Pub. Date: Sep. 3, 2015

(65) Prior Publication Data
US 2016/0133371 A1     May 12, 2016

Related U.S. Application Data

(60) Provisional application No. 61/945,158, filed on Feb. 27, 2014.

(51) Int. Cl.
*H01F 7/20*    (2006.01)
*H02K 1/02*    (2006.01)
*H02K 21/24*    (2006.01)
*H02K 15/02*    (2006.01)
*H02K 1/06*    (2006.01)
*H02K 3/04*    (2006.01)
*H02K 15/06*    (2006.01)
*H02K 15/08*    (2006.01)

(52) U.S. Cl.
CPC .............. *H01F 7/20* (2013.01); *H02K 1/02* (2013.01); *H02K 1/06* (2013.01); *H02K 3/04* (2013.01); *H02K 15/02* (2013.01); *H02K 15/064* (2013.01); *H02K 15/08* (2013.01); *H02K 21/24* (2013.01)

(58) Field of Classification Search
CPC ........ H01F 7/20; H02K 15/08; H02K 15/064; H02K 3/04; H02K 1/06; H02K 1/02; H02K 15/02
See application file for complete search history.

(56) References Cited

U.S. PATENT DOCUMENTS 5,334,899 A * 8/1994 Skybyk ................ H02K 1/2793
                                                                   310/114
5,801,473 A    9/1998 Helwig
(Continued)

FOREIGN PATENT DOCUMENTS

GB         2505475 A     5/2014

*Primary Examiner* — Michael C Zarroli

(57) ABSTRACT

A device such a coil where each components of the electrical structures are completely encapsulated by a magnetic material in a manner that all the magnetic field generated makes a closed loop through a core, amplified and oriented in wished direction.
The coil using this manufacturing method is destined to stators, rotors for axial, radial rotating or linear electric motors, transformers and all devices that generate a magnetic field (non-exhaustive list).

11 Claims, 7 Drawing Sheets

(56) References Cited

U.S. PATENT DOCUMENTS

| | | | |
|---|---|---|---|
| 6,252,327 B1 | 6/2001 | Matsuzaki | |
| 6,313,560 B1* | 11/2001 | Dooley | H02K 1/02 |
| | | | 310/113 |
| 7,119,461 B2* | 10/2006 | Dooley | H02K 1/02 |
| | | | 310/52 |
| 7,755,244 B2* | 7/2010 | Ley | H02K 1/148 |
| | | | 310/201 |
| 8,456,048 B2* | 6/2013 | Lokhandwalla | H02K 1/16 |
| | | | 310/59 |
| 8,796,898 B2* | 8/2014 | Hashiba | H02K 1/02 |
| | | | 310/156.76 |
| 9,287,755 B2* | 3/2016 | Woolmer | H02K 1/14 |
| 9,509,198 B2* | 11/2016 | Jahshan | H02P 23/00 |
| 9,729,016 B1* | 8/2017 | Hunstable | H02K 21/12 |
| 2006/0038456 A1* | 2/2006 | Bojiuc | H02K 23/04 |
| | | | 310/156.32 |
| 2007/0138895 A1 | 6/2007 | Delair et al. | |
| 2011/0140552 A1 | 6/2011 | Lokhandwalla | |
| 2011/0273048 A1 | 11/2011 | Jore et al. | |
| 2014/0103770 A1* | 4/2014 | Brahmavar | H02K 1/16 |
| | | | 310/156.15 |
| 2016/0365755 A1* | 12/2016 | Long | H02K 3/24 |

\* cited by examiner

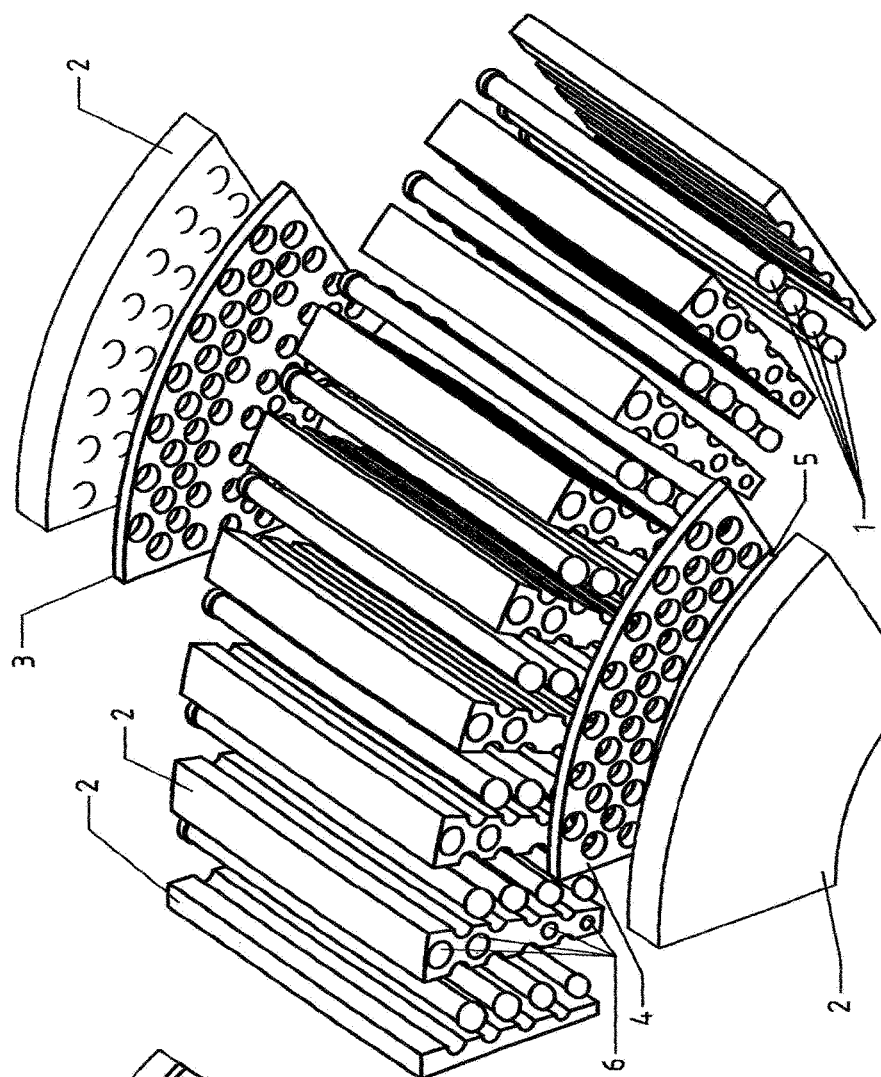
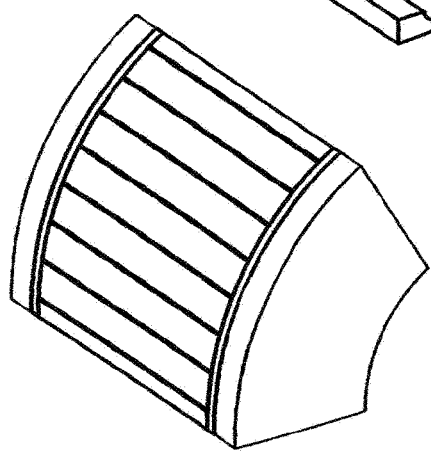
FIG. 1
FIG. 1A

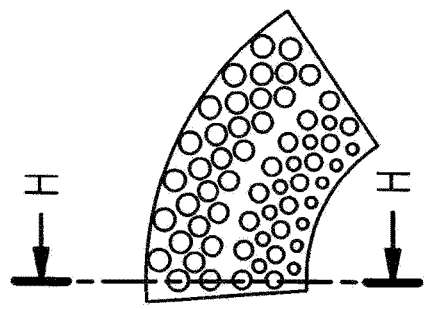
FIG. 2
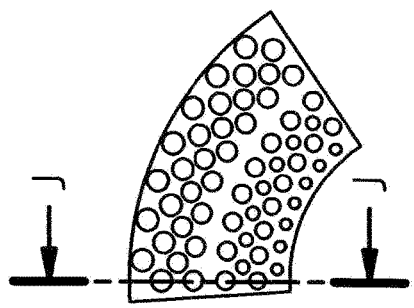
FIG. 2A
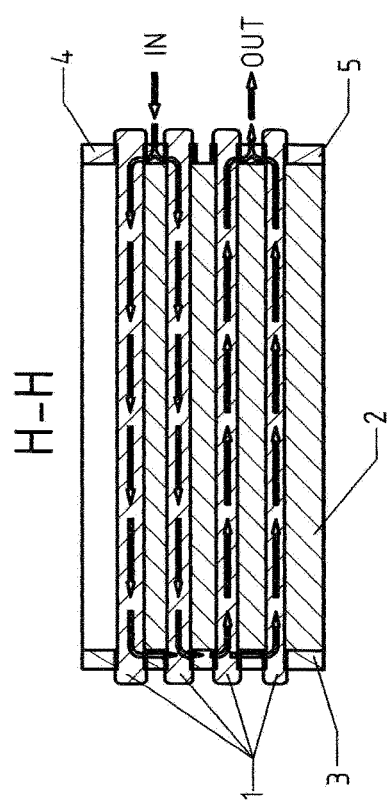
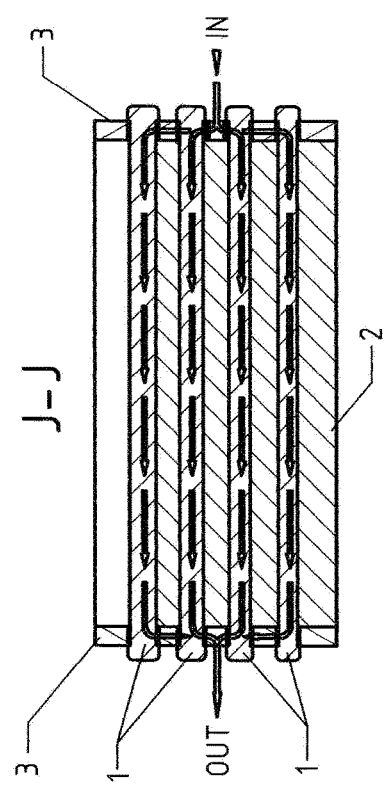

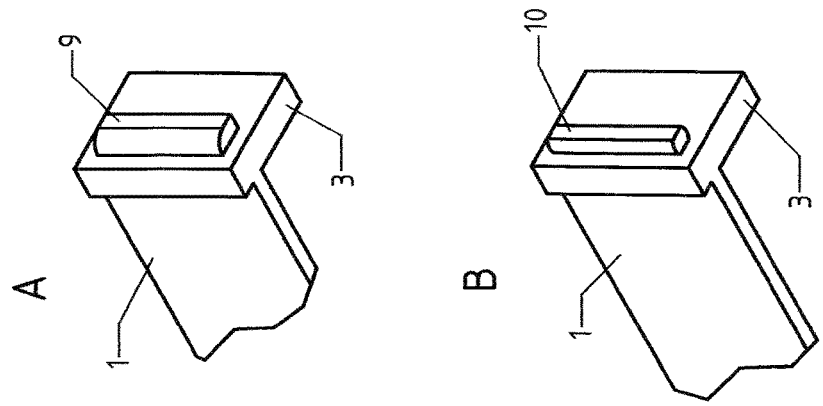
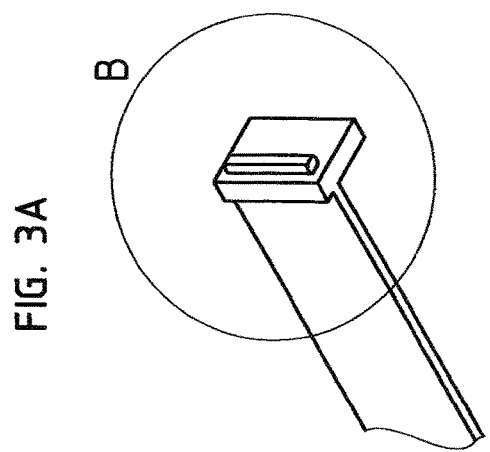
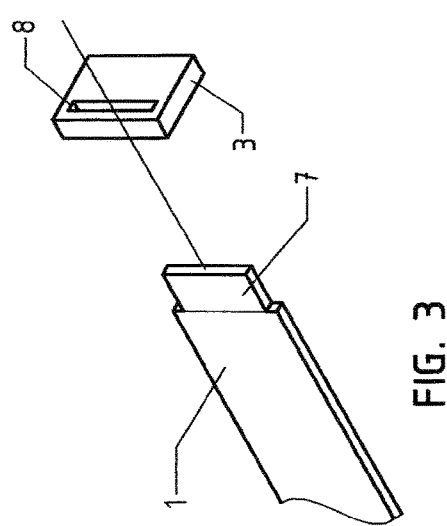
FIG. 3
FIG. 3A
FIG. 3B

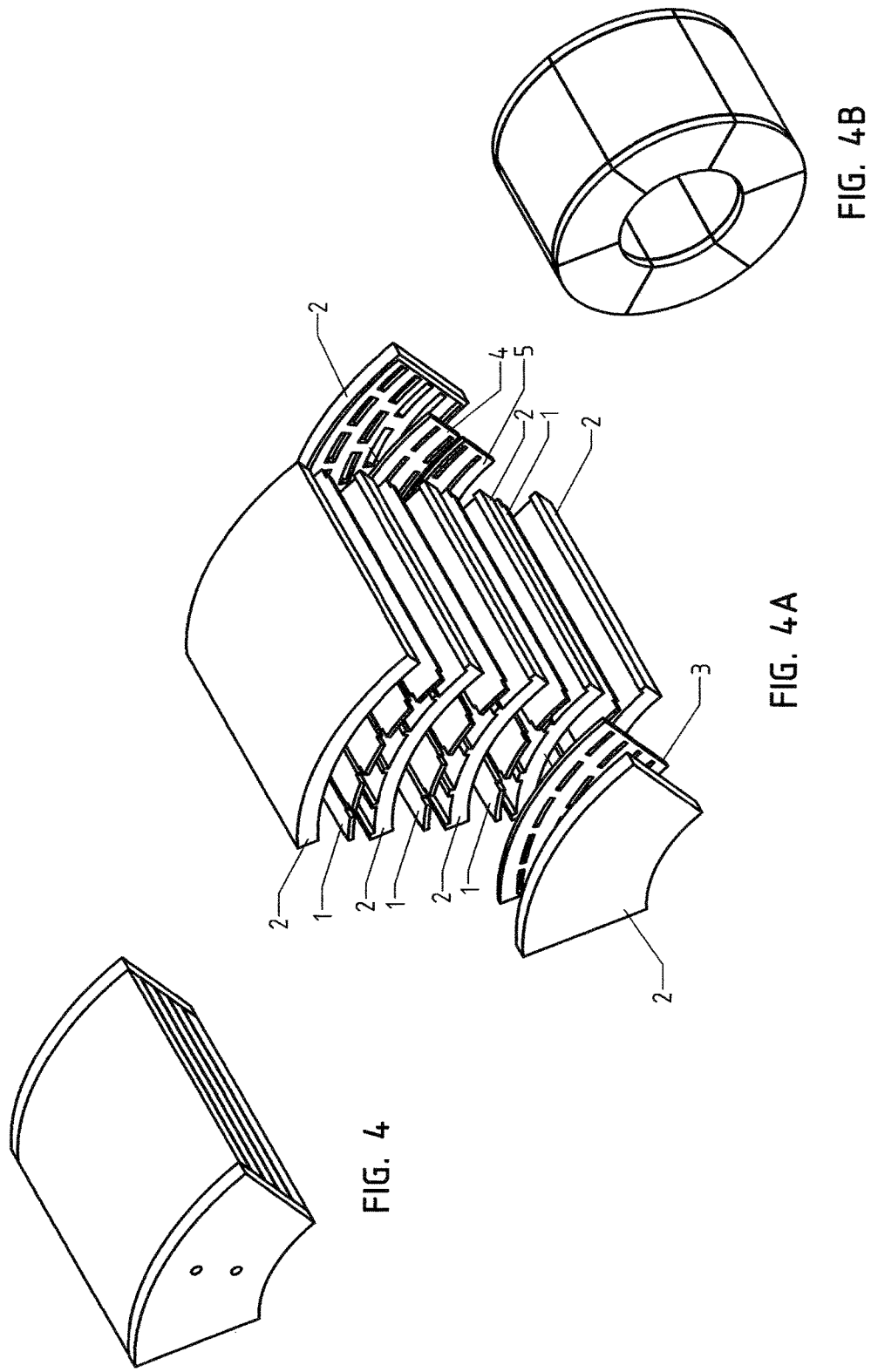

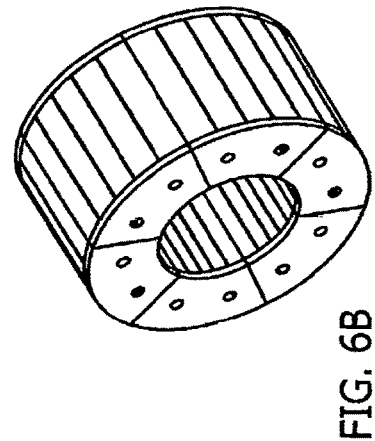
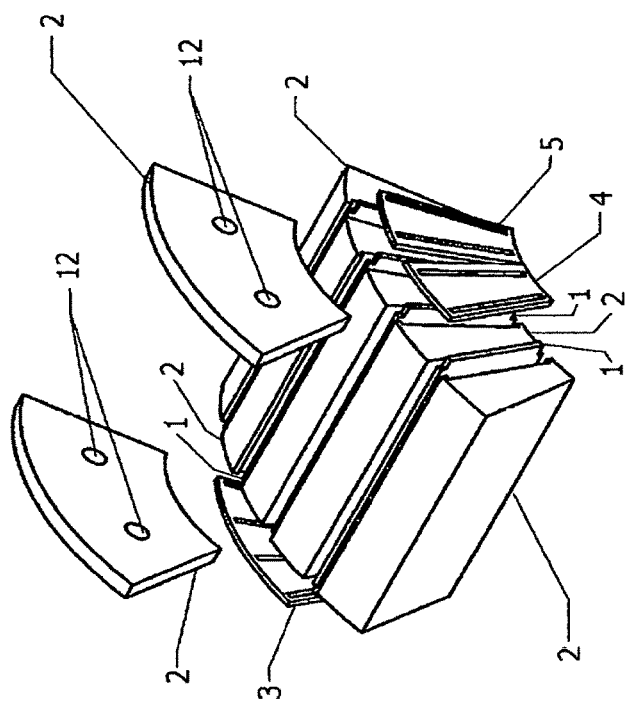
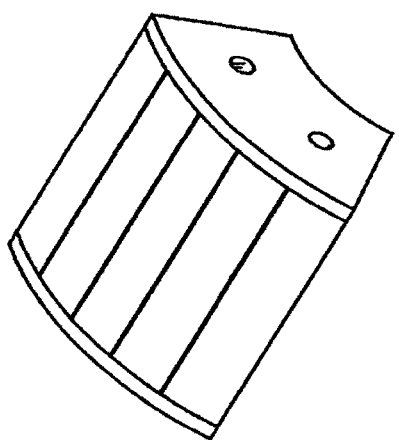
FIG. 6
FIG. 6A
FIG. 6B

ELECTRO-MECHANICAL DEVICE AND MANUFACTURING METHODS FOR VARIOUS APPLICATIONS

BACKGROUND OF THE INVENTION

Electric motors, conventional manufacturing method, consists on a stator with unipolar coils (N or S magnetic pole) in alternate magnetic pole array. Rotor could be manufactured with same unipolar coils or permanent magnets.

Classic manufacturing method consists in winding or staking wires or ribbons of electrical conductive material around a core.

The electric motors having stator constructed with classic coils and rotor constructed with permanent magnets have an efficiency of 85-95%. It is normal because approx. 50% of the magnetic fields is provided by the permanent magnets.

The electric motors who have stator and rotor constructed with classic coils have an efficiency of 35-43%. Conclusion:

Low efficiency of the coil classic manufacturing method: due to

More than 50% of magnetic field generated by electrical current is lost because:

Generated outside of the coil and do not magnetize any core.

Important length of electrical conductor material (wires) it used in turns and grows with the number of layers or windings strands.

Only a small fraction of the magnetic field is perpendicular to the core surface (especially in the case when round wire section is used).

Air gaps between wires/stands/core.

Proximity effect (Induced currents generated by the magnetic field of adjacent wire)

Otherwise, this manufacturing method has other disadvantages:

Impossible to realize a single dipolar coil with its both magnetic poles (N/S) on wished side of the coil.

No magnetic field amplificatory factor (applied only on dipolar coil with external cores).

Impossible to manufacture complex shapes (obligatory to have a constant section in case of ribbon winding).

Cogging run motors.

Less mechanical rigidity.

Slowly winding process in reason of small space between cores and insulation injured risk.

BRIEF SUMMARY OF THE INVENTION

The disclosed invention solves these problems by a new manufacturing process when:

Each single component of electrical structure (electrical main conductors disposed on rows and connecting end plates) is stacked alternately with a core segments and completely encapsulated by this, without gaps (insulating or adhesive materials is not considered here) in manner that, the path of all magnetic field make a closed loop exclusively through the magnetic material of core segments.

All the electrical main conductors connected together by plates, placed to opposite ends of them. (Plates could be in, but not necessary, same electrical conductive material).

Plates reduce the number of turns, and by placing a core segment on external faces of the plates, it is possible to use all magnetic field generated.

Depends on position of layers composed by the electric main conductors (vertical, horizontal, arc horizontal and axial or radial) and connecting end plates (up and down or opposite lateral faces) we can choice the magnetic pole faces.

Wherein, on one face, two separate connecting ends plates are used and electric current (single phase) is apply IN/OUT on each of them, a single dipolar coil could be created with the same possibility to choice the magnetic poles faces.

Any complex coil shape could be created in respect of electrical and laws of magnetism:

Total electrical resistance (R) of first group of electrical main conductors, connected by the first end plate must be equal to second group connected by the second end plate.

The theoretical core volume attributed to the first group must be equal to core volume attributed to the second group.

The dipolar coils are preferred in reason of: Multiple possible assemblages (Halbach array, sandwich of N coils separate by the external core segments, single with external core segments).

Magnetic flux can be concentrated in wished face of the coil and amplified (depending of external cores position).

It is not necessary to use predominant direction magnetic materials.

Wherein, on opposite faces a single plate connect all the main conductors and electric current (single phase) is apply IN/OUT on each of them unipolar coil could be created.

The unipolar coils are in conventional disposition (serial connected).

If necessary to redirect the magnetic field on precise coil face the position of electrical main conductor's layers must be in accordance with the core segments magnetic materials orientation (grain oriented silicon steel, compounds of soft iron and dielectric resins with predominant magnetic direction, not limitative list).

Many different processes and materials can be utilized to manufacture the coil components (main conductors, connecting end plates, cores segments) and their assembling. (Please report to detailed description).

BRIEF DESCRIPTION OF THE DRAWINGS

Sheet 1/7
FIG. 1—illustrates a first coil model.
FIG. 1A—exploded view of the coil shown in FIG. 1.
Sheet 2/7
FIG. 2 and cross-section H-H—illustrate the electric current flux and faces to be apply to obtain a single dipolar coil.
FIG. 2 A and cross-section J-J—illustrate the electric current flux and faces to be apply to obtain a single polar coil.
Sheet 3/7
FIG. 3—illustrates a mechanical assembling process between electric main conductors and connecting end plates.
FIG. 3A and detail A—illustrate a key manufacture between electric main conductors and connecting end plates.
FIG. 3B and detail B—illustrate a different key manufacture between electric main conductors and connecting end plates.
Sheet 4/7
FIG. 4—Illustrates a second coil model.
FIG. 4A—Illustrates an exploded view of coil shown in FIG. 4.
FIG. 4B—illustrates an assembly of six coils shown in FIG. 4.

Sheet 5/7

Figure 5B:
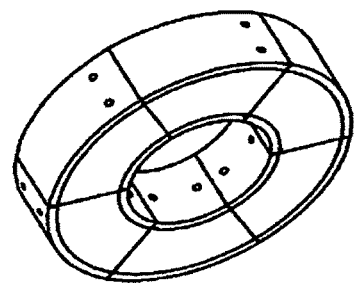
Figure 5A:
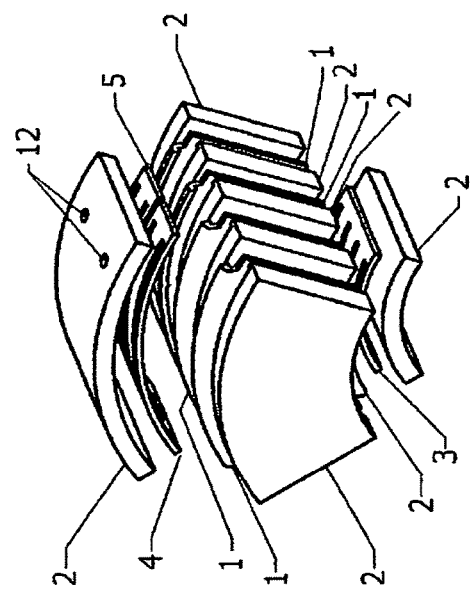
Figure 5:
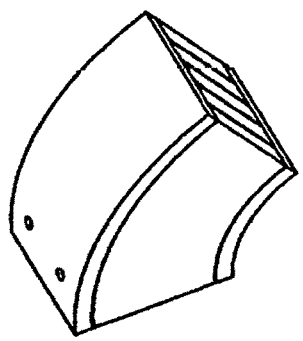

FIG. 5—Illustrates a third coil model.

FIG. 5A—Illustrates an exploded view of coil shown in FIG. 5.

FIG. 5B—illustrates an exploded view of coil shown in FIG. 5.

Sheet 6/7

FIG. 6—Illustrates a fourth coil model.

FIG. 6A—illustrates an exploded view of coil shown in FIG. 6.

FIG. 6B—illustrates an exploded view of coil shown in FIG. 6.

Sheet 7/7

Figure 7:
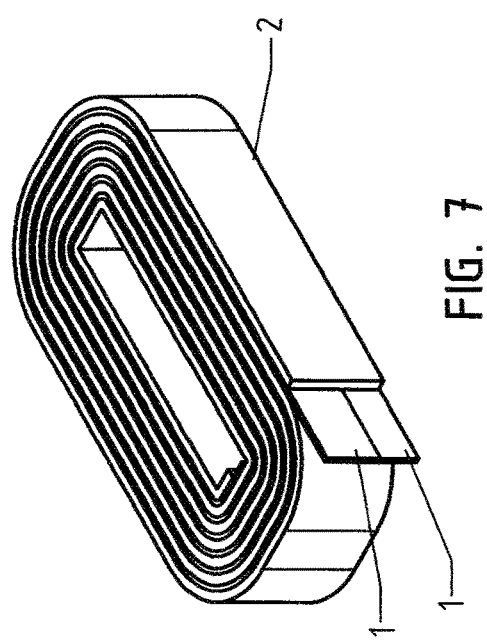

FIG. 7—illustrates a fifth coil model.

Figure 8:
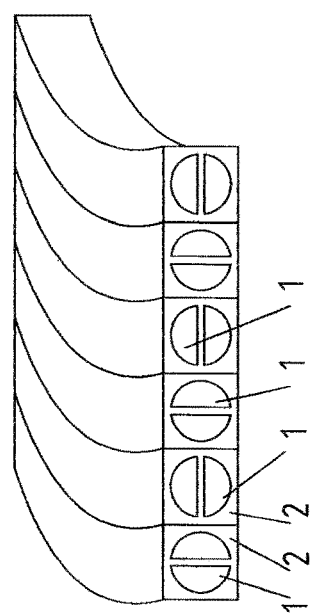

FIG. 8—illustrates a ribbon composed by wires completely encapsulated by a magnetic material core.

DETAILED DESCRIPTION OF THE INVENTION

For clear understanding references, numerals identify the same elements in all sheets and figures:

Reference numeral 1—Electrical main conductors.

Reference numeral 2—Core segments.

Reference numeral 3—Connect end plate.

Reference numeral 4 and 5—Separate connect end plates.

Unipolar coil—Single coil with N or S magnetic pole

Dipolar coil—Single coil with both magnetic field (N and S)

Electrical structures (assembles of electrical main conductors and connect end plates).

Main core assembles of core sectors who totally encapsulate the electrical main conductors.

External core segments (outside the main core) are placed (not obligatory) over the connect end plates.

For a drawn simplification all the devices illustrated in sheets, the coil have only four rows and core segments in necessary numbers to completely encapsulate them.

Electrical main conductors are disposed in rows, composed by: Single (ribbon of electrical conductive material sheets).

Multiple shapes (ribbons of electrical conductive material sheets).

Single (cutouts could be made in manner to obtain a precise value of electric resistance R by sectional surface control).

Multiples wires (unlimited cross-section shape).

Different manufacture process employed for the electric main conductors and connecting ends plates depending on choice of materials, components sizes and shapes.

Commune to the tenth following methods: core segments must be beforehand electrically insulated.

First Method:

When Copper, Silver, Aluminum (no—limitative list) are used, complex shapes can be obtain by mechanical transformation (stamping-filled-forged-tooling-turning-grinding-press forming-cutting by Laser, plasma, water-jet, EDM process, etc.) on existing plates, ribbons or wires.

Electrical main conductors must be pasted (epoxy resins, adhesive films) first on core segments.

Subs-assemble electrical main conductors-core segments pasted (epoxy resins, adhesive films) together in main coil core.

Install the connecting end plates and fixed them by mechanical key (method shown in FIG. 4-FIG. 4A—FIG. 4B). Pasted with an electrical conductive resin or any welding process is also possible.

Install the connecting end plates and core segments (epoxy resins, adhesive films).

Second Method:

Electrical main conductors by PCB process (etched from sheets of Copper, Silver, Aluminum no-exclusive list) laminated directly on core segments including connecting end plates segments.

Subs-assemble electrical main conductors-core segments pasted (epoxy resins, adhesive films) together in main coil core.

Assembling the connecting end plate sectors by welding process or pasted with electrical conductive resins.

Third Method

Electrical main conductors make by 3D printing of an electrical ink (e.g. Silver Ink, Graphene ink, Gold ink, no-exclusive list) directly on core segments.

Subs-assemble electrical main conductors-core segments pasted (epoxy resins, adhesive films) together in main coil core.

Connect end plates by 3D printing on lateral faces.

Install the connecting end plates core segments (epoxy resins, adhesive films).

Fourth Method:

Electrical main conductors and connected end plates by bonded an electrical compound (electrical conductive resin and electrical conductive powder metal, e.g. Copper, Silver, Aluminum no-exclusive list) on final shape mold.

Electrical main conductors must be pasted (epoxy resins, adhesive films) first on core segments.

Subs-assemble electrical main conductors-core segments pasted (epoxy resins, adhesive films) together in main coil core.

Install the connecting end plates and fix them by paste with an electrical conductive resin.

Install the connecting end plates core segments (epoxy resins, adhesive films).

Fifth Method:

Electrical main conductors and connect end plates by sintered electrical conductive powder metals (e.g. Silver, Copper, Aluminum no-exclusive list) on final shape mold.

Electrical main conductors must be pasted (epoxy resins, adhesive films) first on core segments.

Subs-assemble electrical main conductors-core segments pasted (epoxy resins, adhesive films) together in main coil core.

Install the connecting end plates and fix them by paste with an electrical conductive resin.

Install the connecting end plates core segments (epoxy resins, adhesive films).

Sixth Method:

Electrical main conductors and connect end plates on electrical conductive powder metals (e.g. Silver, Copper, Aluminum no-exclusive list) by one of following (same family) process:

EBM—Electron Beam Melting

SLS—Selective Laser Sintering

DMLS—Direct Metal Laser Sintering

Electrical main conductors must be pasted epoxy resins, adhesive films) first on core segments.

Subs-assemble electrical main conductors-core segments pasted (epoxy resins, adhesive films) together in main coil core.

Install the connecting end plates and fix them by paste with an electrical conductive resin.

Install the connecting end plates core segments (epoxy resins, adhesive films).

Seventh Method:

Electrical main conductors, connect end plates, insulating stratum and core segments made by 3D printing machine provided with three printing heads, print alternately, but in a single operation.

First head print with electrical compound.
Second head print with an insulating resin.
Third head print with a magnetic material compound.

Eighth Method:

Electric main conductors made by electro-deposition of an electric metal/material (e.g. Copper, Silver, no-exclusive list) directly on core segments.

Subs-assemble electrical main conductors-core segments pasted (epoxy resins, adhesive films) together in main coil core.

Connect end plates by electro-deposition on lateral faces.
Install the connecting end plates core segments (epoxy resins, adhesive films).

Ninth Method:

The core segments assembled in final core, as shown in FIG. 4 without the electrical main conductors FIG. 4 A (1) and connect end plates FIG. 4 A (3) (4) and (5). Inject an electrical conductive compound, (in the empty core cavities by one of electrical connecting holes FIG. 4 (12). Before the injection process, the core segments assembly could be placing in a mold or vise/nipper (optional) in manner to secure the operation when very high pressure is used. Main conductors and connect end plates can be realized in same mono-block structure. Individual coil can be manufactured or entire stators/rotors (x coils) Including coils connectivity, could be product without any assembling/winding process.

Tenth Method:

A different manufacture process (extruding) can be employed to completely encapsulate a single wire or wires in ribbon array, with a magnetic material compound (compound with flexible or rigid resin depends on final destination. Examples are shown in FIG.-7 and FIG.-8, In this case, wires must be insulated first.

Core Segments Manufacturing Methods

Core segments can be manufacture in various methods and materials. Due to reduced size of segments (they are only components of complete core) is easy to obtain laminations on wished direction when grain oriented silicon steel is used, or lamination on amorphous metals. Maximum ribbon width in general is 400 mm for grain oriented steel and 50 mm for amorphous metals. Staked lamination can be make plane or in arc without any form restriction (by mechanical transformation).

All magnetic powder material (amorphous metals-Iron-Silicon Iron-Phosphorous Iron-Iron Nickel, no-limitative list) and all manufacturing process (steel bonded-sintered metals-EBM-SLS-DMLS) can be used to realize the core segments without any form of restriction. A particularly manufacture process is: bonded compound, in final shape mold, of amorphous metal powder and dielectric resin with predominant magnetic direction.

In all assembling process with the electrical main conductors and connect end plate, electric insulation is required, preference is for epoxy resins, electrostatic paint, but all materials and process can be used (especially adhesive films if employed to connect the elements).

Optional holes through the core segments could exist with any form or size restriction in manner to adjust the core volume (can be used as cooling system).

Unipolar and dipolar coil common characteristics.

Depends on rotor motor configuration (in runner, out runner or disk) the position of layers composed by the electrical main conductors (vertical, horizontal, arc horizontal and axial or radial) and connecting end plates (up and down or opposite lateral faces) we can choice the magnetic pole faces.

The position of electrical main conductor layers must be in accordance with the core segments layer directions.

Different possibilities to concentrate the magnetic flux on preferred face of the coil.

Unipolar Coil

Main core and external core segments in magnetic material with predominant direction (grain oriented silicon steel, compounds of soft Iron and dielectric resins with predominant magnetic direction, no limitative list).

The rotor motor can be constructed with the same unipolar coil or permanent magnets.

Dipolar Coil

Halbach array disposition.

In the same volume and place of an single coil an assembly of three small dipolar coils in respect of Halbach array (serial electrically connected). Different polarities combinations can be made in manner to concentrate the magnetic flux on wished side of the assembly in accordance with the motor configuration.

The motor rotor can be constructed with the same assembly of dipolar coils or permanent magnets.

DETAILED DESCRIPTION OF THE SEVERAL VIEWS OF THE DRAWING

FIG. 1—illustrates a complete coil with core segments of the main core disposed in vertical, radial, arc position and core segments over connecting end plates.

FIG. 1 A—exploded view of the coil shown in FIG. 1 with:

Four layers (eight wires/layers) of electrical main conductors (1) disposed in horizontal, axial and arc position.

Eleven core segments (2). Nine for main core (seven+two identical) and two over the connecting end plates.

Connecting end plates (3)-(4)-(5) placed on axial and vertical position.

Optional holes for core volume adjustment (6) (could be used for a cooling system).

FIG. 2—cross-section H-H—illustrates the current flux (single phase) through electrical main conductors (1) and connecting end plate (3) when is apply (IN) on connecting end plate (4) and exit (OUT) by connecting end plate (5), plus core sections (2) (dipolar configuration).

FIG. 2A—cross-section J-J—Illustrates the current flux (single phase) through electrical main conductors (1) and opposite connecting end plates (3) when is apply (IN) and exit (OUT) plus core section (2) (unipolar configuration).

FIG. 3—illustrates an assembling process wherein the electrical main conductor (1) have a reduced cross-section zone (7), which will be passed through a hole (8) (with an adequate section) made on connecting end plate (3).

FIG. 3A—and detail A illustrate a fixed method (key) wherein exceeding zone (7) of electrical main conductor (1) is blending (9) on top or below direction along the connecting end plate (3).

FIG. 3B and detail B—illustrate a different fixed method (key) wherein exceeding zone (7) of electrical main conductor (1) is deformed by tapering (10) and looked against the connecting ends plate. Another method, no—illustrates here is to twist the exceeding zone (7) of electrical main conductor (1) and looked against the connecting end plate.

FIG. 4—illustrates a complete coil with core segments of the main core disposed in horizontal, axial, arc position and core segments over connecting end plates with electrical connecting holes (12).

FIG. 4 A—exploded view of the coil shown in FIG. 4 with:

Four layers (each one with a different ribbon number) of electrical main conductors (1) disposed in horizontal, axial and arc position.

Seven core segments (2). Five for main core (all different in form and size) and two over connecting end plates.

Connecting end plates (3)-(4)-(5) placed on axial and vertical position.

FIG. 4B—illustrates perspective view of a six coils assembly shown in FIG. 4 and FIG. 4A.

FIG. 5—illustrates a complete coil with core segments of the main core disposed in vertical, axial, position (core segments over connecting end plates are not shown here).

FIG. 5A—exploded view of the coil shown in FIG. 5 with:

Four layers (single sheet) of electrical main conductors (1) disposed in vertical, axial and arc position.

Five core segments (2). (all identical).

Connecting end plates (3)-(4)-(5) placed on axial (top and below) horizontal and arc position.

FIG. 5B—illustrates a perspective view of a six coils assembly shown in FIG. 5 and FIG. 5A.

FIG. 6—illustrates a complete coil with core segments of the main core disposed in vertical, radial and arc position (core segments over connecting end plates are not shown here).

FIG. 6 A—exploded view of the coil shown in FIG. 6 with:

Four rows (single sheet) of electrical main conductors (1) disposed in vertical, radial and arc position.

Five core segments (2). (All identical).

Connecting end plates (3)-(4)-(5) placed on axial and vertical position.

FIG. 6B—Illustrates a perspective view of a six coils assembly shown in FIG. 6 and FIG. 6A.

FIG. 7—illustrates a different manufacturing process wherein two electrical main conductors (1) (single possible, not shown here) is pasted first on an electrically Insulated magnetic material and wound in manner to form a dipolar device (unipolar wherein single main conductor is used).

FIG. 8—illustrates a different realization wherein wires, utilized as electric main conductors (1) (with no-restriction on section shapes) completely encapsulate by a magnetic material (2).

Ribbon with twelve wires shown but numbers and different arrays could be used. Single wire completely encapsulated by a magnetic material. (No-length limitation). The device can be used in straight disposition or wound in no-limited modes and final shapes.

Embodiments described above illustrate but do not limit this disclosure. It should also be understood that numerous modifications and variations are possible in accordance with the principles of present disclosure. Accordingly, the scope of this disclosure is defined only by the following claims.

The invention claimed is:

1. A single monolithic electromechanical device wherein; each single component of the device's electrical structure is staked alternately with magnetic material core segments and, the entire device is also completely encapsulated by this magnetic material core material on the device's entire surface, this encapsulation is done in a manner to totally suppress induced currents produced by the proximity effect.

2. The electromechanical device of claim 1 wherein; a particular array of electrical main conductors, connect ends plates, core segments and external core segments are used in a manner to redirect the magnetic flux at a device face.

3. The electromechanical device of claim 1 wherein; the electrical structure's core segments and an insulating stratum are made in a single operation by a 3D printing method.

4. The electromechanical device of claim 1 wherein; the electrical structures are made by injection of an electrical conductor compound in the empty cavities of core segment assemblies, previously electrically insulated, in a manner to reduce assembling and winding processes of the electrical system.

5. The electromechanical device of claim 1 wherein; a single or two electric main conductors is/are sealed on magnetic material core and wound together in various shapes in a manner to obtain a unipolar or dipolar device.

6. The electromechanical device of claim 1 wherein; a single or plurality of electric main conductors with various cross-section shapes and sizes, are completely encapsulated by the magnetic material core in a manner to form a wire or cable in unipolar or dipolar configuration.

7. The electromechanical device of claim 1 wherein: holes, of various shapes or sizes, are made through the core segments in a manner to adjust the core volume and have equal magnetic field intensity inside the core.

8. The electromechanical device of claim 1 wherein; holes of various shapes and sizes are made through the core segments in a manner to place a cooling system.

9. The electromechanical device of claim 1 wherein; holes, of various shapes and sizes, are made through the external core segments in a manner to connect the device to the power source or to another device.

10. The electromechanical device of the claim 1 wherein; the flux path of a magnetic field of each single component of the electrical structure makes a closed loop exclusively through a magnetic material in a manner where all the magnetic field generated by each single component can be amplified and redirected on a face of the coil by the core segments.

11. The electromechanical device of claim 1 wherein; the electrical structure is divided in two equal parts connected together in a manner to create a dipolar coil with the both magnetic poles N and S, on a face, either front/rear or up/down or lateral faces.

* * * * *